July 10, 1962     O. S. PLANTINGA ETAL     3,043,301
DRESSING
Filed Jan. 21, 1958     2 Sheets-Sheet 1
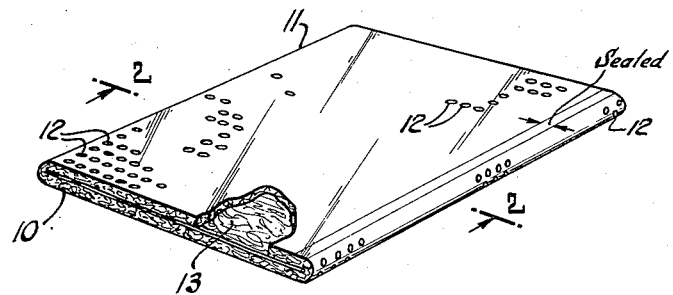
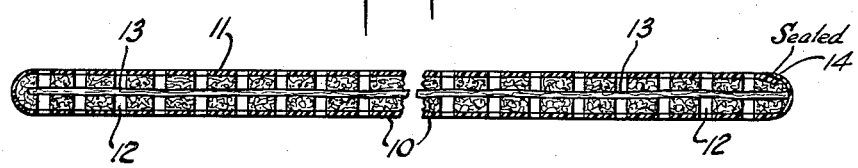
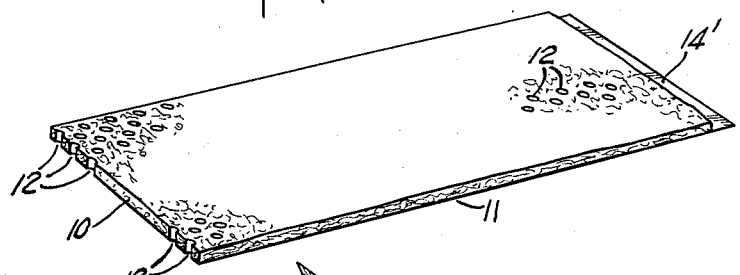
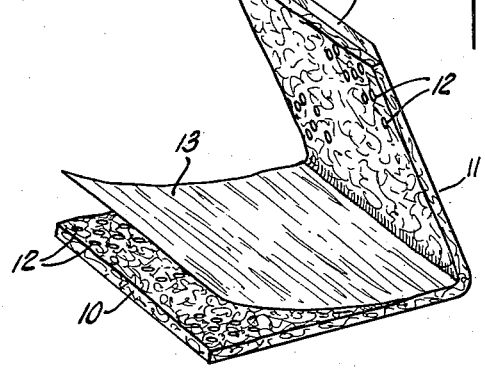
INVENTORS
OLIVER S. PLANTINGA
ROBERT J. TREWELLA
BY
Harold L. Warner
ATTORNEY July 10, 1962  O. S. PLANTINGA ETAL  3,043,301
DRESSING
Filed Jan. 21, 1958  2 Sheets-Sheet 2
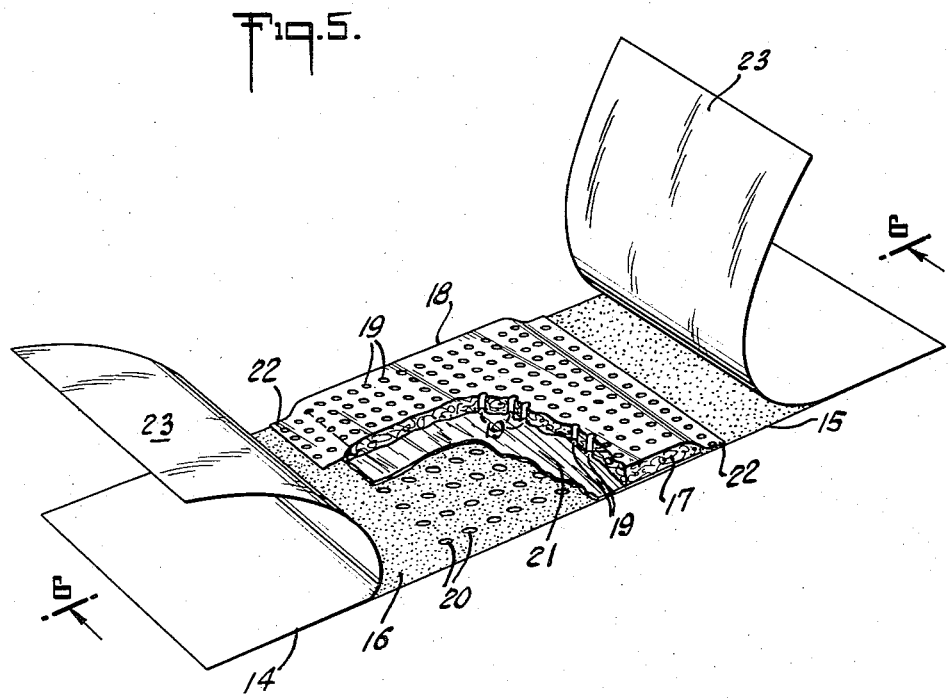
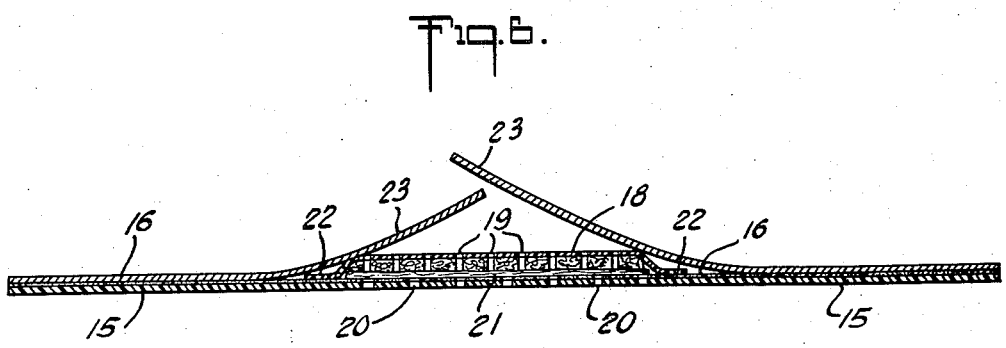
INVENTORS
OLIVER S. PLANTINGA
ROBERT J. TREWELLA
BY
Harold L. Warren
ATTORNEY 3,043,301
DRESSING
Oliver S. Plantinga, Princeton, and Robert J. Trewella, Milltown, N.J., assignors to Johnson & Johnson, a corporation of New Jersey
Filed Jan. 21, 1958, Ser. No. 710,243
4 Claims. (Cl. 128—156)

The present invention relates to surgical dressings and more particularly to dressings wherein the surface adapted to face the wound is formed of a perforated smooth flexible film.

It has generally been recognized that in the natural healing of animal wounds, the dressing serves primarily as a protection for the wound during the healing process. The problem with generally used dressings is that during the healing process the eschar tends to form or grow around parts of the dressing, thus making it difficult later to remove the dressing without tearing the eschar or scab and thus delaying the healing process. In order to overcome this, it has heretofore been proposed to use a smooth, thin, flexible non-water soluble film in direct contact with the wound. The film, which may be made of any smooth flexible material, is perforated or cut to permit passage of fluids through the film to an absorbent backing. Dressings have been proposed wherein the flexible, non-water soluble, perforated film is bonded to or wrapped around an absorbent pad. Dressings of this type are described, for example, in the British patent to Gelinsky, 439,085, specification acceptance date, November 28, 1935, and the French patent to Weber 947,609, published July 7 1949.

Although these film-faced dressings are a substantial improvement, insofar as preventing adherence of the dressing to the wound during the healing process, the size of the holes or perforations in the film must be quite small in order to prevent the eschar from adhering to the absorbent material in the immediate vicinity of the perforations. Also, there is a substantial tendency for the perforations to become plugged or corked, thus decreasing the effectiveness of the absorbent backing, this tendency being greater the smaller the perforations.

It is an object of the present invention to prepare film-faced dressings in which there is substantially less tendency for the eschar to adhere to the absorbent backing. It is a further object of the present invention to form perforated film-faced dressings having improved absorbent properties. A still further object is to form film-faced dressings in which the perforations can be larger while avoiding adherence to the absorbent backing, thus permitting more rapid and complete drainage from the wound.

It has been discovered that the heretofore-mentioned problems encountered with perforated film-faced dressings are substantially overcome and the above and other objects and advantages realized, if the perforations in the film extend down into the absorbent pad or backing to which the perforated film is secured. This may be done by first preparing a perforated pad of absorbent material and then facing it with a perforated film or by bonding an imperforate film to an absorbent pad or backing and then perforating, as by punching, both the film and the pad together or by any other suitable method for forming a composite dressing having a perforated film facing and a perforated absorbent backing.

Although the best results are obtained when the perforations in the pad are in direct alignment with the perforations in the film, substantial improvements in non-adherence and absorption are also obtained where a substantial number of the film perforations are not directly over corresponding holes in the absorbent material, as where there is overlapping through misalignment of the perforations in the absorbent pad and film or where the perforations in the pad are somewhat smaller than those in the film.

Where the dressing is completely wrapped in the film material or is backed with a normally impervious material such as a plastic adhesive-coated backing, it is important that the backing, although not in contact with the wound, also be perforated to permit breathing and evaporation.

In preparing dressings in accordance with the present invention, care should be taken that the perforations do not extend completely through the dressing so as to permit direct access from outside the dressing to the wound surface unless the dressing is designed to be used as a part of a further complete dressing where it is to be backed by further absorbent or covered in some other manner.

In the preferred practice of the present invention, a layer of absorbent material is first bonded to a thin smooth, flexible film and the composite article then punched with the punch going completely through the absorbent layer and the film. The absorbent layer with the film facing is then folded with the film on the outside, the ends of the film then being bonded to each other to form a complete wrap for the enclosed absorbent material. Prior to folding, an imperforate sheet of absorbent material, such as crepe tissue or nonwoven fabric, is placed between the folds so that there will be no direct opening passing through the dressing. The imperforate layer of absorbent material can be omitted if the holes are so punched and the composite so folded that none of the holes in the folded article overlap so as to permit a direct passage through the dressing, or where the dressing is to be used, in a manner wherein it will be covered. However, since it is extremely difficult to avoid some alignment of holes, it is generally preferred to insert a non-perforated layer of absorbent as described. The amount or thickness of absorbent used is of course dependent on the efficiency of the absorbent and type of wound with which the dressing is to be used, i.e., with wounds where only a small amount of exudation is encountered, the absorbent layer may be quite thin. It is generally preferred, however, that the absorbent layer have a thickness of at least 40 mils.

The invention is further illustrated by the drawings, in which:

FIGURE 1 is a perspective view of a dressing made in accordance with the present invention;

FIGURE 2 is a cross section taken along the line 2—2 of FIGURE 1;

FIGURE 3 is a perforated composite of absorbent material and lubricous film prior to forming into the dressing of FIGURE 1;

FIGURE 4 illustrates the insertion of the imperforate absorbent layer during the preparation of the dressing in FIGURE 1;

FIGURE 5 is an adhesive bandage having a wound-covering pad made in accordance with the present invention; and FIGURE 6 is a cross-sectional view taken along line 6—6 of FIGURE 5.

Referring to the drawings, the dressing of FIGURE 1 is formed of an absorbent material such as several layers of absorbent surgical cellulose crepe tissue 10 wrapped in a perforated flexible smooth film 11. The perforations 12 extend down into the absorbent 10, as best illustrated in FIGURE 2. Complete passage through the dressing is prevented by an intermediate layer 13 of non-perforated absorbent material. This layer may be of cellulose crepe paper, nonwoven cellulose fabric, or any other form of absorbent sheet in which the individual fibers are sufficiently close or sufficiently matted to filter any air passing through the perforations to the wound surface.

One method of forming the dressing of FIGURE 1 is to first bond the absorbent filler 10 to film 11 by any suitable cement, as illustrated in FIGURE 3. The composite absorbent backing and film are then perforated, as by punching, the perforations 12 going completely through the composite. The composite absorbent and film are then folded with the film 11 on the outside, as illustrated in FIGURE 4. The sheet of non-perforated absorbent 13 is placed within the fold. The edges of the film are then bonded to each other as at 14, preferably through an extended edge or lip 14', to make the complete dressing. The bonding may be done either by a suitable cement or by heat sealing if the film is of a thermoplastic nature.

The embodiment shown in FIGURE 5 is a dressing of the adhesive bandage type, wherein 15 is a backing strip either of fabric or film coated with an adhesive 16. Secured to the strip 15 is a pad 17 of absorbent material covered by a thin smooth flexible film 18. Perforations 19 pass through the film and absorbent pad 17. The adhesive-coated backing strip 15 has perforations 20 in the area under the pad to permit breathing of the dressing and evaporation from absorbent 17. In order to prevent direct passage through the dressing from alignment of holes 19 with perforations 20, an imperforate absorbent layer 21 is provided. In the particular embodiment illustrated, the film 18 extends beyond the pad area and is bonded to the adhesive-coated backing 15 at 22. When it is desired to completely cover the absorbent pad 17, the film 18 can be made sufficiently large to extend over all edges of the pad. Where the pad is of the same width as the adhesive-coated backing, the extending edge of the film, corresponding to the edge of the backing, is folded around and under the pad and bonded to the adhesive of the backing. Where the absorbent pad 17 is narrower than the backing 15, the extending edge of the film can be bonded in the same manner as at 22. The adhesive 16 of the backing is protected by protective strips 23 which are removed prior to application of the bandage.

The dressing of FIGURE 5 is preferably formed by first perforating a composite sheet of absorbent and film, as above described, and then securing this to a previously perforated adhesive-coated backing strip, after inserting the imperforate layer 21 of absorbent material between the perforated composite and the perforated backing strip. The adhesive-coated strip may be of any of the forms generally used, such as an adhesive-coated fabric or an adhesive-coated polymer film. The adhesive may be any of the pressure-sensitive adhesives generally used for this purpose.

The perforations in the film should be present in sufficient number to permit ready passage of excretions from the wound surface into the absorbent backing. It is generally preferred that these perforations have an open area equivalent to a circle having a diameter of 0.01" to 0.20" and be present in sufficient number and so dispersed as to provide, for each square inch of film surface, an open area of at least 0.0075 square inch, the open area generally varying within the range of 0.1 to 0.4 square inch per square inch of film.

Rather than first bond the film to the absorbent backing and then simultaneously punch the film and absorbent, as previously described, the absorbent and film may be punched separately and then assembled into the combined dressing, or the absorbent backing may be a preformed nonwoven perforated fabric sheet of the type described in application Serial No. 503,871, filed April 26, 1955, wherein the nonwoven perforated fabric is formed by pushing the fibers aside and compacting them, thereby increasing the frictional engagement and interlocking between the fibers. Nonwoven fabric sheets of this type are highly absorbent and are already provided with uniform perforations. When combined with a perforated film to form a composite bandage of the type described, the bandage is found to have excellent wound release properties as well as readily absorbing wound exudate. Although it is generally preferred to align, insofar as practically possible, the perforations in the absorbent backing with the perforations in the film, in practice, it will be found that most of the perforations are not in direct alignment. However, sufficient alignment can readily be obtained to give a dressing of improved absorption and wound release characteristics. Substantially improved results are obtained even when no more than about 30% of the open area in the film is directly over openings extending down into the absorbent backing.

In the preferred practice of the present invention, polyethylene terephthalate films, such as sold under the trademark "Mylar" by E. I. du Pont de Nemours and Company, are used because of their flexibility, resistance to high temperatures, such as used in steam sterilization, their strength, and their somewhat lower cost as compared to other suitable film materials. However, any film may be used as long as it is sufficiently flexible, insoluble in water, substantially inert to the wound excretions, and sufficiently thin to readily adapt itself to the surface conformity of a wound. Other film materials that have been successfully used are films made of high pressure polyethylene, low pressure polyethylene, irradiated polyethylene, polyvinyl chloride, plain parchment paper, cellulose acetate, polyvinylidene chloride and nylon.

The film should be quite thin, film thicknesses of less than 0.001 inch generally being preferred. There is no limit to film thinness except strength.

Where the perforated film is bonded to the perforated absorbent backing, the adhesive used should preferably be non-water soluble and one that does not interfere with the healing process or tend to stiffen the film facing. It should also maintain its bond after sterilization. Organic solutions of terephthalate copolymer esters are found to be excellently suited for this purpose.

In describing the present invention, the preferred manner of forming the dressing has been given in which the absorbent material is punched completely through and a separate sheet of non-perforated absorbent material inserted. If desired, the layer of imperforate absorbent material can be omitted and essentially the same result obtained by punching only part way through the absorbent layer so that the unpunched portion acts as an imperforate sheet to prevent any direct passage through the completed dressing. However, only partial punching is difficult to achieve and the preferred practice, as described, is to punch completely through the absorbent and then insert a separate sheet or layer that has not been punched.

Although various modifications of the invention have been described in order to illustrate the same, the invention is not limited to these specific modifications which are given for the purpose of illustration only. Accordingly, it is intended to cover in the appended claims all modifications and equivalents within the spirit of the invention.

Having thus described our invention, we claim:

1. A dressing comprising an absorbent pad formed of a nonwoven fabric having openings therethrough, the fibers surrounding said openings being held in place by interlocking and frictional engagement with each other, a flexible non-absorbent perforated film on both sides of said pad, the film on at least one side being formed of a flexible smooth material relatively non-adherent to healing tissues, the perforations in said flexible smooth film having open areas equal to a circle having a diameter of 0.01 to 0.2 of an inch and being present in sufficient number and so distributed as to provide, for each square inch of film surface, an open area of at least 0.0075 square inch, said absorbent pad containing at least two layers of said nonwoven fabric separated by a layer of non-perforated absorbent material.

2. The dressing of claim 1 wherein the flexible smooth film is formed of polyethylene terephthalate.

3. The dressing of claim 1 wherein the non-perforated absorbent material is creped cellulose tissue.

4. The method of manufacturing dressings comprising bonding a flexible, smooth film to one face of a layer of absorbent material to form a composite structure, forming a plurality of holes through said composite structure of film and absorbent material, folding said composite structure onto itself with a sheet of non-perforated absorbent material between the folds, and bonding the ends of said film to each other.

References Cited in the file of this patent

UNITED STATES PATENTS

| 2,734,503 | Doyle | Feb. 14, 1956 |
| 2,877,765 | Bunyan | Mar. 17, 1959 |

FOREIGN PATENTS

| 778,813 | Great Britain | July 10, 1957 |
| 776,408 | Great Britain | June 5, 1957 |